June 16, 1953 F. URBACH 2,642,538
THERMAL RADIOGRAPHY USING PHOSPHORS
Filed Feb. 11, 1949 4 Sheets-Sheet 1
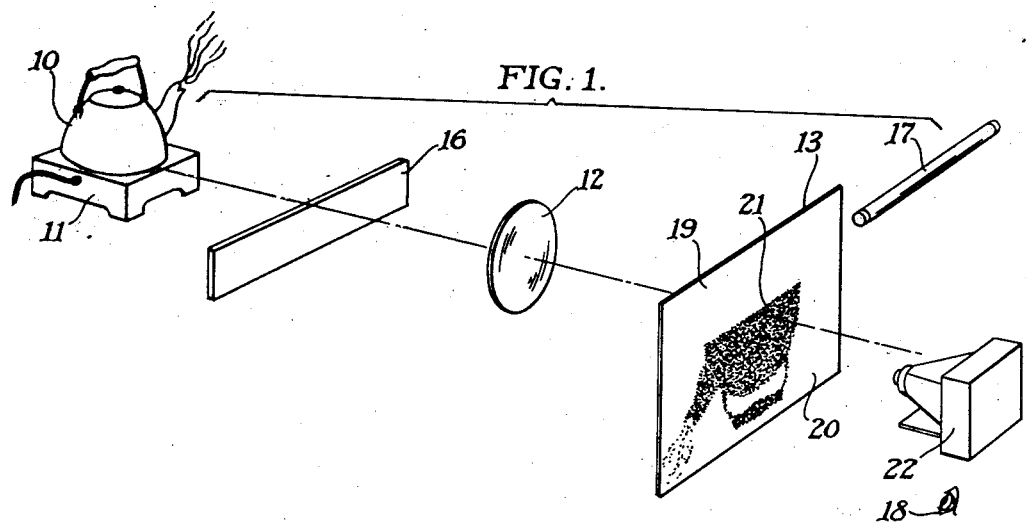
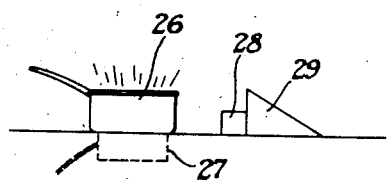
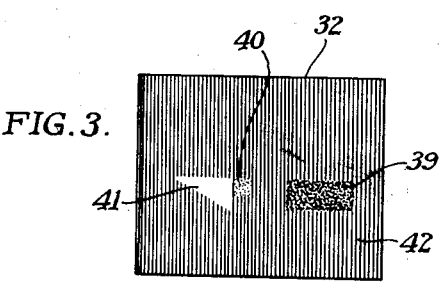
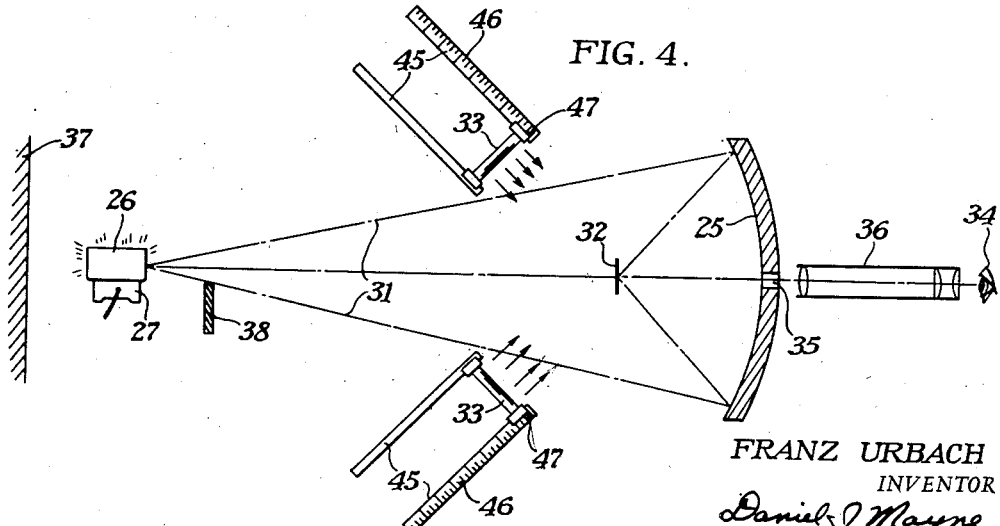
FRANZ URBACH
INVENTOR

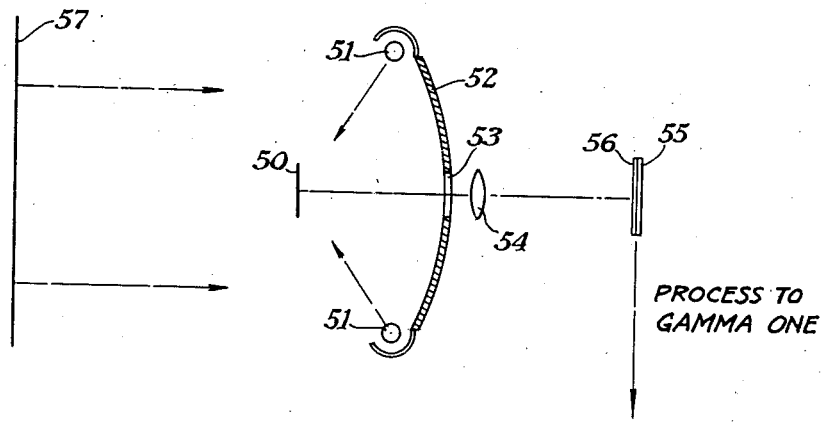
FIG. 5A.
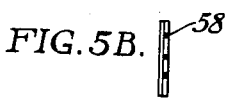
PROCESS TO GAMMA ONE
FIG. 5B.
FIG. 5C.
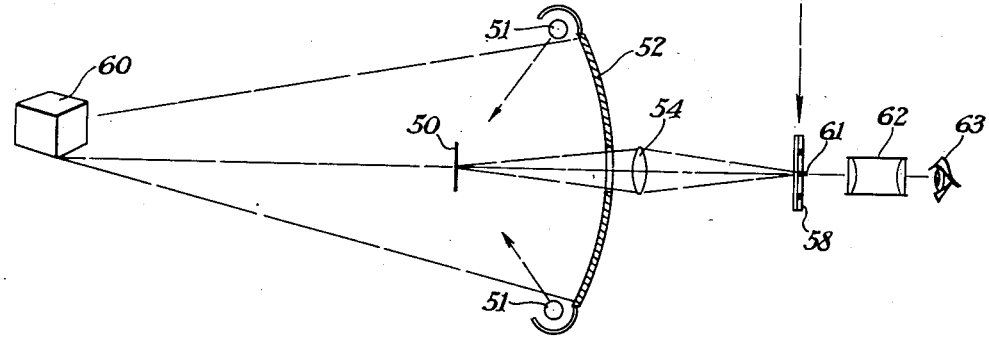
FIG. 6.
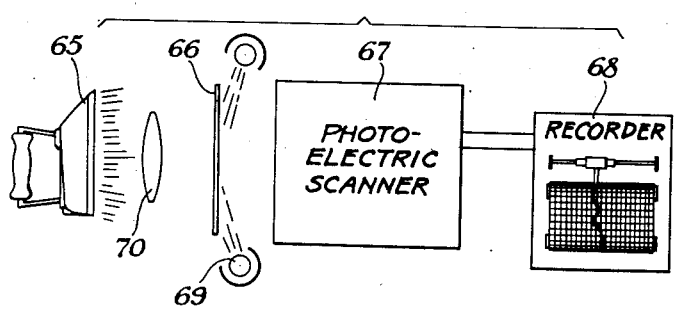
FRANZ URBACH
INVENTOR June 16, 1953 F. URBACH 2,642,538
THERMAL RADIOGRAPHY USING PHOSPHORS
Filed Feb. 11, 1949 4 Sheets-Sheet 3
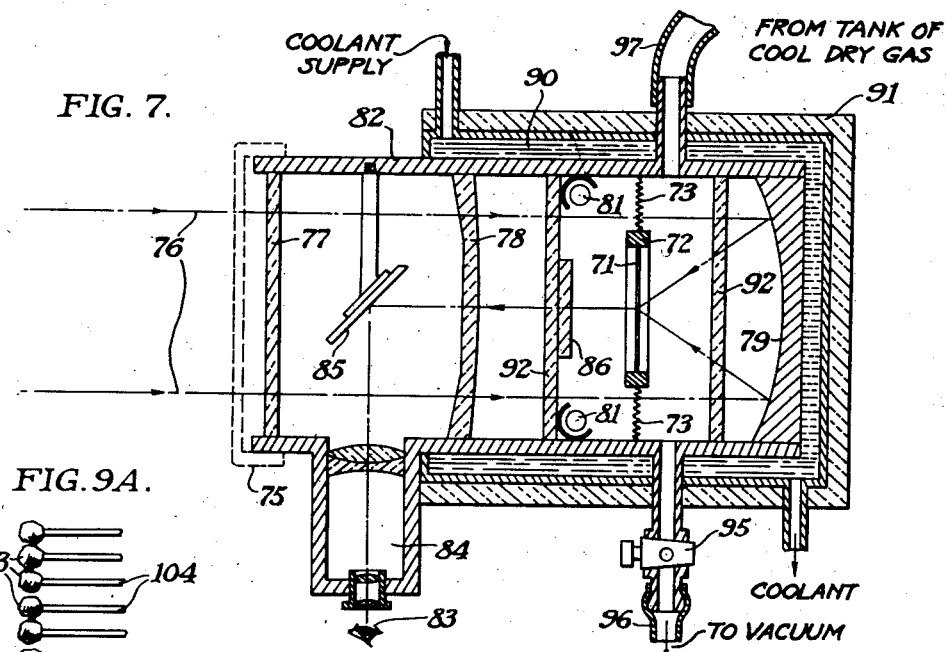
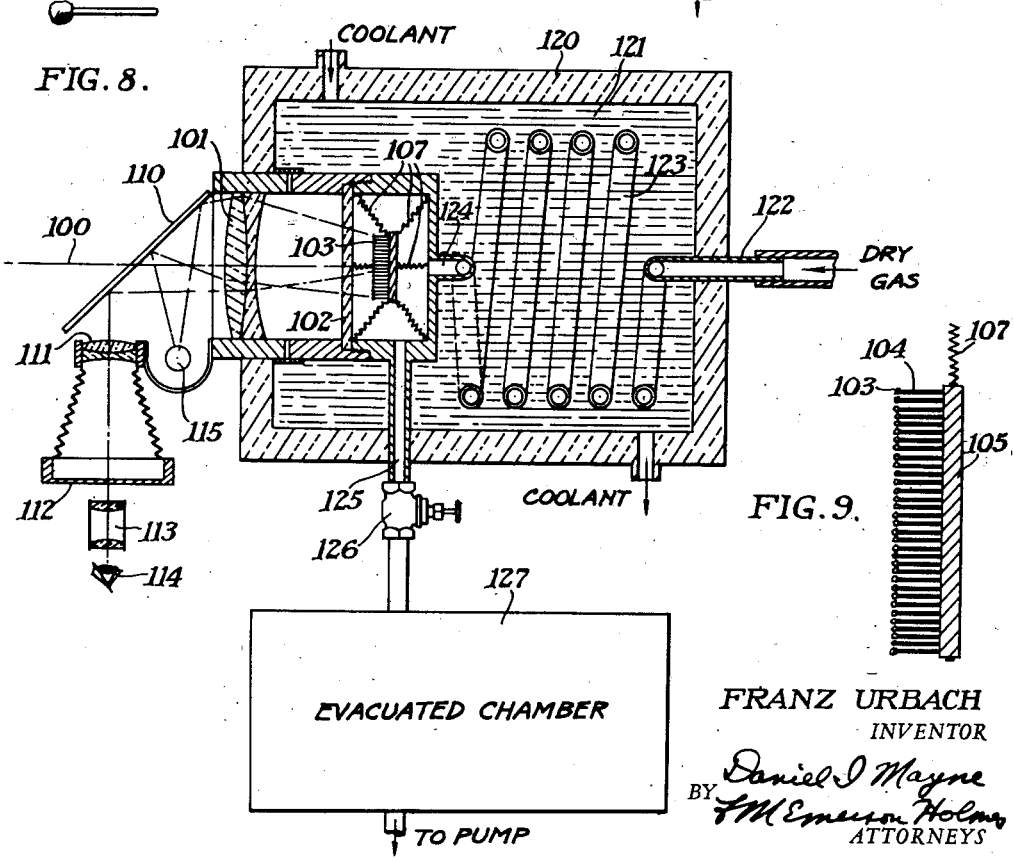
FRANZ URBACH
INVENTOR

FRANZ URBACH
INVENTOR

Patented June 16, 1953

2,642,538

UNITED STATES PATENT OFFICE 2,642,538

THERMAL RADIOGRAPHY USING PHOSPHORS

Franz Urbach, Rochester, N. Y., assignor to Eastman Kodak Company, Rochester, N. Y., a corporation of New Jersey Application February 11, 1949, Serial No. 75,822

13 Claims. (Cl. 250—71)

This invention relates to the production of visible images by means of radiation of long wavelengths and to the photographic recording of such images. In particular, it is concerned with the visual observation and photographic recording of images produced by the thermal radiation of various objects. For the purposes of this specification the methods for this problem are called thermoradioscopy and thermoradiography. The latter term will also be used to cover both visual observation and photographic recording of the images referred to above. In more convenient commercial terminology they are referred to as projection thermography as distinguished from contact thermography, as described in my co-filed application Serial No. 75,823, now Patent No. 2,551,650.

Two broad classes of methods for the formation of visible images by means of wavelengths beyond those of the visible spectrum may be distinguished. In one class, specific quantum effects are used, like the photoelectric effect on infrared-sensitive cathodes, the stimulation of infrared-sensitive phosphors, or the latent image formation on infrared-sensitized photographic emulsions. The second class comprises those methods which utilize the thermal effect of the image-forming radiation. To this class belong the so-called evaporography, the image detection by means of so-called thermoscopic or thermochromic substances, and the methods based on thermoelectric effects in combination with scanning systems in the receiver and in a display device. Among the methods of this second class, the first-named do not require scanning, which represents a great advantage from the point of view of simplicity. However, these methods have considerable other disadvantages. They either operate only in an extremely narrow temperature range, or they require long exposure times in order to reach reasonable sensitivities. The method of the present invention belongs to the non-scanning subdivision of the second class, but offers considerable advantages over the other non-scanning methods, particularly as to sensitivity, speed of response, sturdiness and simplicity of the equipment, and simplicity of operation.

As used in this specification, the term "fluorescence" refers to the luminescence observed during the incidental of exciting radiation, while the term "phosphorescence" is applied to the luminescence observed after the exciting radiation has been cut off.

According to the present invention a long wavelength radiation image of a radiant object or a radiation reflecting object is formed by suitable optical means on a fluorescent screen uniformly illuminated by a suitable exciting radiation and consisting of a fluorescent material, the fluorescent efficiency of which depends strongly on its temperature. The temperature distribution created by the incident radiation becomes visible on such a screen due to the brightness changes or variations which correspond to that temperature distribution. The brightness distribution thus created is understood or interpreted as temperature distribution by comparison with observations of the brightness of the phosphor screen at known temperatures in the range of its operation. In particular, the observed brightness distribution may be compared with the brightness distribution observed by forming a long wavelength image of an object of known temperature distribution and radiant properties on the same screen, either simultaneously with, or prior or subsequent to the formation of an object unknown as to its temperature or thermal radiation. The image thus produced may be either observed visually or recorded photographically. A large number of luminescent substances is known which show in certain temperature intervals a more or less strong dependence of their efficiency on temperature. My invention may be carried out with any of these substances if its temperature is held within the region of strong temperature dependence of efficiency.

Although my invention can be practiced with known materials, there are seven additional aspects of the subject which warrant separate consideration in that they constitute either alternative or cooperating ways of getting maximum effect.

I have found that particularly good images, that is, images of high contrast, can be obtained (1) with all suitable substances under certain special conditions of temperature, and (2) with many of these substances under certain special conditions of intensity of the exciting radiation. (3) I have also found certain substances which are particularly suitable for use in my invention. (4) Moreover, I have found that under certain circumstances it is advantageous to use such substances which exhibit a strong temperature sensitivity at low temperatures and to operate the apparatus according to this invention at low temperatures. (5) I have devised certain means of observation and photography involving masking which make it possible to reach particularly high sensitivity in the arrangements according to this invention. (6) I have devised a number of special arrangements with which the methods here disclosed may be carried out. (7) I have devised certain types of luminescent screens of a special structure, suitable for this invention.

These seven specific points are separately discussed under appropriate subtitles below, following the general discussion of the operation of the invention.

Obviously, the functioning of the invention is independent of the source or kind of radiation provided it is absorbed by the luminescent screen. The only radiations for which the present invention is difficult to apply are those in the visible region for which there is no need of a special detector, or in the ultraviolet region for which detection by other means, for example, simple fluorescence, suffices. The radiation may come from any selective or non-selective radiator. The image on the screen may be an ordinary optical image produced by any image forming system suitable for the radiation in question, or it may be a spectrum of any appropriate light source, for instance, an infrared image or an absorption spectrum. The infrared image may be that of a source of radiation or of a radiation reflecting, or transmitting, object.

The information may also be used to observe, measure, or record infrared radiation without any image-forming device. A luminescent screen may, for instance, be arranged at a small distance from a surface, the thermal radiation of which is to be observed or controlled, and the brightness of this screen, under defined conditions of excitation, may be observed, measured, or recorded.

One important application of the present invention is the observation or recording of differences in radiance of various objects. These differences may be due (a) to differences in emissivity of various objects or parts of objects. In particular, the invention serves very satisfactorily for the detection of warm or cool objects against a background of a different temperature. It is possible, for example, to obtain with the aid of this invention an image of a hot plate or a teakettle or even human limbs against the background of room temperature. On the other hand, visible images of cool objects, like a piece of Dry Ice or of ordinary ice, may be detected against the same room temperature background. Even the difference in the radiation of ice and Dry Ice is easily discernible which demonstrates the sensitivity to the far infrared radiation caused by the heat of ordinary ice. Also the temperature distribution within a given object, for instance, on the surface of a heating element, may be recorded by this invention. An example of differences in radiance in an object of uniform temperature is the detection of hardly visible spots of transparent material on a polished metal surface which is heated to a uniform temperature.

In many cases, the radiation to be detected will be absorbed by the phosphor screen, either by the phosphor itself or by its binder or support. In other cases, it may be desirable to increase absorption of the radiation by using a special binder or support or an appropriate backing of the support. If the screen has adequate absorbing properties, any thermal radiation may be detected by the devices according to the invention without specific wavelength limitations. In fact, everything from short electromagnetic waves in the range of high frequency to ultraviolet frequencies may be detected. Finally, the effect of elastic waves, for instance, ultrasonics, may be made visible by the present invention, since these too are directly converted into heat.

The temperature dependence of phosphors in some cases provides an increase of efficiency, and in other cases, a decrease of efficiency, with increasing temperature. In other words, the efficiency may have negative or positive temperature coefficients. With many phosphors the positive sign occurs in one temperature region and the negative sign in the other. Both positive and negative temperature coefficients may be used for the invention. They will give positive and negative images of a warm object against a colder background, respectively.

*Temperature ranges*

The detectability of a small brightness difference on the luminous screen depends in a complex manner on the percentual brightness difference and the brightnesses involved. At high brightness levels this detectability is mainly determined by the percentual difference. At lower brightness levels, a given percentual difference will be less well detectable than at higher levels. On the whole, however, the percentual difference is the most important factor. For the purposes of this disclosure, we shall, therefore, define the temperature coefficient as the percentual change in brightness per degree centigrade temperature.

I have found that with most phosphors suitable for the invention the temperature coefficient, as defined in the preceding paragraph, is much larger at certain temperatures at which the efficiency of the phosphor is much smaller than the maximum efficiency. Accordingly, I use the phosphors in temperature regions in which their efficiency is very low, in fact, so low as to be useless for any known purpose other than of this invention. In certain cases, I use phosphors with negative temperature coefficients at normal temperature and very low efficiency at that temperature. These same phosphors would have very much higher efficiency at lower temperatures. In other cases, I provide cooling or heating devices which keep either the whole receiver or the phosphor screen alone within a temperature region in which it has a low efficiency. This region may be somewhat above or to any extent below normal room temperature.

All phosphors tested show some temperature effect. Many apparently have a fairly constant brightness (fluorescence efficiency) throughout a range of temperatures extending from a point as low as measurements have been made up to a high point above which the efficiency falls off. Others have efficiencies which fall off at temperatures both lower and higher than the optimum range. Negative temperature coefficients correspond to the falling off at the upper end of the range in both cases. Since contrast is a function of the relative rather than the absolute decrease (or increase) in brightness (i. e., the steepness of the log brightness versus temperature curve) and since according to a preferred embodiment of my invention contrast or steepness is greater at fluorescent efficiencies lower than one-third of the optimum efficiency, I maintain the phosphor at a temperature in a range above (or below) that of maximum efficiency, specifically in a range in which the efficiency is less than one-third the optimum efficiency. Of course the brightness must be greater than .0001 microlambert if the eye is to see it with a useful sensitivity to brightness contrast and must be greater than 1 microlambert if the phosphor is to be photographed with anything less than impractical long exposures.

Incidentally this brings out one important difference between the present invention and my cofiled application mentioned above, relating to phosphors in contact with a hot body. In the present invention, the phosphor can be brought to, and maintained at, the temperature at which it is most sensitive, independent of the temperature of the test object (whose image is projected to the phosphor). In the cofiled case, the phosphor (or the excitation intensity as discussed below) must be selected to suit the temperature range being measured; also actual temperatures as well as relative temperatures or temperature distribution are measured by the contact system.

Excitation intensity

With many of the phosphors suitable for this invention, for instance, with some sulfide and some silicate phosphors, it has been found that the temperature coefficient as defined before depends, at a given temperature, on the intensity of the exciting radiation. The temperature coefficient is usually highest at comparatively low intensities. In particular, the coefficient has been found to be very high in certain intensity regions in which the efficiency increases with increasing intensity at a given temperature. This means, in the first place, that it is possible to control to a large extent the contrast of the image and, particularly, the region of temperatures distinguishable on the phosphor, by controlling the intensity of the exciting light. If, for instance, an object is to be inspected or photographed, the temperature of which varies over a wide range, I use a comparatively high intensity of excitation. If, on the other hand, an object is to be viewed or recorded in which only one small temperature difference exists, I use a low intensity of excitation in order to obtain the highest possible contrast in the image. I also use higher intensities of excitation on a given phosphor screen whenever the temperatures or temperature differences to be recorded are in a higher temperature range.

In the second place, it appears that there is some close correlation between temperature sensitivity and nonlinearity of response. The normal constant efficiency is represented by direct proportionality of brightness to the intensity of the existing radiation, i. e., by linear response, whereas nonlinearity of response means that the efficiency is changing. It is much easier and quicker to measure linearity of response than to measure temperature or change in temperature. I have found that the best sensitivity to temperature gradient is in nonlinear phosphors although the theory of this correlation is not completely understood. Therefore, when I want particularly high thermal response I select a phosphor, a temperature, and an exciting intensity at which the brightness versus excitation curve is nonlinear. Preferred examples of such phosphors are the zinc or cadmium sulfides or preferably mixtures of these preferably containing some pure zinc sulfide or zinc or cadmium selenides or mixtures of these or of all four. Pure CdS or pure CdSe are very poor compared to the mixtures containing some zinc sulfide or selenide. The presence or absence of the type of activator used is not material to the existence of this nonlinear feature of the invention but may be selected for some other reason such as the hue or brightness desired in the fluorescence; it is true that nonlinearity may occur with any of the known activators in ZnS or ZnSCdS; however, the activator greatly influences the temperature and intensity range at which nonlinearity occurs, e. g., replacement of Ag activator by Cu activator results in a shift of the nonlinear range to higher temperatures, and/or lower intensity. Any standard activator is quite satisfactory.

In accordance with this principle of intensity dependence, I provide in the devices embodying this invention, means for controlling the intensity of exciting radiation. This is done either by arranging the exciting light source, for instance, a mercury arc equipped with an ultraviolet filter, at a variable distance from the luminescent screen, or by controlling in ultraviolet-emitting fluorescent lamps the current of discharge in this lamp by means of a suitable variable transformer or resistor.

Preferable phosphors

One of the classes of phosphors which I have found particularly useful for the present invention is prepared in the same way as conventional zinc sulfide phosphors, either unactivated or activated by silver, copper, or manganese, except that in addition to the conventional activator, a comparatively large amount of a so-called "killer" or "poison" of fluorescence is added. As an example, a phosphor consisting of zinc cadmium sulfide containing equal parts by weight of zinc and cadmium activated by 400 parts per million of silver with an addition of 4 parts per million of nickel is very satisfactory for thermoradiography. The comparatively large addition of nickel makes this phosphor totally unsuitable for nearly any other use at room temperature. It is for this reason that the presence of nickel in the materials from which such phosphors are made is usually carefully avoided, although in some cases, much smaller amounts of nickel have been added to certain zinc sulfide or zinc cadmium sulfide phosphors to suppress the long persistent afterglow of the phosphors. However, those nickel quantities or quantities of other killers were always selected so as to impair little or not at all, the fluorescence of the material. The zinc or zinc cadmium phosphors I use for the present invention contain an amount of nickel or other killers which reduces considerably its fluorescence efficiency under the conditions of use preferably to less than one-third its value without the poison or killer. It is interesting to note that higher sensitivity to thermal effects is gained in general by lower fluorescent efficiency and also at lower than optimum excitation.

While the control of intensity makes it possible with some phosphors to use one screen for a variety of observations, there are cases in which it is advisable to change screens for various observations. In these cases provision is made in the devices embodying this invention to change quickly from one screen to another. As an example, I have found it very advantageous to use a set of screens belonging to the zinc sulfide or zinc cadmium sulfide class, with the individual screens differing only by the nickel content of the phosphor. In other cases in which no use of the principle of intensity variation can be made or is not made, one may use other sets of screens. As an example, I mention a set of screens containing a phosphor consisting of mixed crystals of calcium tungstate and lead tungstate with different amounts of the lead component. In the case of the first set (sulfides with various amounts of nickel) excitation by the near ultraviolet, for instance, a 3650 Å. mercury line, or even by blue light may be used. In the second set (tungstates), excitation with mercury line at 2537 Å. may be used.

It should be realized that while the most useful phosphors for the present invention are those which have a very strong temperature dependence and change therefore their efficiency from a high value to nearly zero in a comparatively small temperature interval, this same property necessarily limits the temperature range or region in which a phosphor can be used. In some cases, mixtures of several phosphors with different temperature ranges are employed with color changes, as well as brightness changes, produced by the image-forming radiation. It is also possible to obtain such color changes with suitable single phosphors, for example, zinc sulfide activated by silver and manganese or zinc cadmium sulfide activated by silver and copper or by very small amounts of one single activator, like copper or manganese.

As mentioned before, one may use phosphors with either positive or negative temperature coefficients. Since no example for the former has been given, one is mentioned at this point. Cadmium silicate containing less than one-hundredth of a mole per cent manganese, excited at room temperature by 2537 Å., has a comparatively high positive temperature coefficient and may be used accordingly if a positive image of the object is desirable.

All of these particular phosphors having a fluorescence highly dependent on temperature are similarly useful in contact methods of temperature detection as described in my co-pending case mentioned above.

Low temperature types

This refers to the temperature at which the phosphor operates, not the temperature of the body or object being examined. If the screens of luminescent material used in this invention are thin enough or have a suitable structure, the main exchange of energy between these screens and their surroundings occurs by thermal radiation. The temperature of the screen with no radiant object imaged on it is determined by its radiative thermal equilibrium with the surrounding space and objects, including the various parts of the radiation-detecting device. An investigation of the effect of an image-forming radiation on the phosphor shows that the largest temperature differences are obtained if the radiant energy exchange, especially between the phosphor and its surroundings, is minimized. Accordingly, it is advantageous to maintain at a low temperature the phosphor and/or the surrounding materials by suitable cooling devices. When this is done, it is, of course, necessary to use a phosphor which has a high temperature coefficient at the low temperature of operation, or, for a given phosphor, to adjust the operating temperature so as to maintain the phosphor in a region of high temperature coefficient.

I name, as an example of phosphors suitable for operation at low temperature, lead tungstate excited by the mercury resonance light at 2537 Å. This phosphor can be operated at a temperature somewhat above that of Dry Ice. Another example is strontium tungstate excited by the same radiation, which may be operated advantageously at a temperature approaching that of liquid nitrogen.

Masking

If the detection of very small temperature differences is desired, it is necessary to make distinctly visible or to photograph very small brightness differences on the phosphor. With phosphor screens and light sources of the conventional types, this is practically often limited by small unavoidable inhomogeneities of either the exciting illumination or of the phosphor layer itself or by small temperature variations over the phosphor surface due to other causes than the image-forming radiation. In order to eliminate these inhomogeneities I have found it advantageous to use a system of masking.

The device is set up in the same manner in which it is intended to be used normally. A photographic negative of the luminous screen is then produced by conventional methods on a suitable negative material which is then developed to a gamma of 1. The negative thus obtained is then superimposed on the luminescent screen between the screen and either the eye of the observer, or the photographic material used for recording of thermoradiographs, in such a position that it evens out the small brightness differences in the screen mentioned above. Thus a uniform luminous area is provided on which very small brightness differences are easily seen or photographed. This may be done in various ways, depending on what is being measured. The mask may be placed in contact with, or very close to, the phosphor on the side opposite that of the image forming system, when provision is made for excitation of the side of the phosphor on which the image forming system is located, and when the phosphor is observed from the opposite side. In another case, the mask is placed in the plane of the real image in a viewing system through which the screen is viewed by the observer. Such a viewing system may be used on either side of the screen. When thermoradiographs are being taken, the mask may be placed close to, or in contact with, the photographic material on which the picture of the screen is formed. Finally, the taking of the thermoradiographic picture may be done without mask, and a transparency made from the mask may be used as a mask in the printing of the thermoradiographic negative. This latter system has proven to be particularly applicable to a number of practical situations. All of the ways utilize the same masking principle for eliminating irregularities in the screen which might interfere in critical work.

Special arrangements

A variety of arrangements of the elements necessary to carry out the invention has been used successfully. Most of them consist essentially of an optical system, either mirror or lens system, or a combination of both, producing the thermal image on the phosphor screen which is arranged in the image surface of the optical system. They include furthermore a source, or sources, of exciting radiation arranged in such a manner as to produce a fairly even illumination of the phosphor screen. Furthermore, provision is made for observation of the phosphor either with the naked eye or with a suitable viewing system. A useful arrangement is obtained, for example, by forming the thermal image by means of a concave mirror around whose border exciting lamps are arranged, and in the center of which a hole is located through which the screen is observed. Other arrangements comprise, in addition to the elements enumerated thus far, a cooling system and radiation shields arranged in such a manner as to protect the phosphor screen from most or all the radiation of the objects and space surrounding the reserver. In some arrangements the phosphor or the whole receiver is placed into an evacuated chamber, which prevents practically all the conductive or convective exchange of energy of the phosphor with its surroundings. While most of the uses of the present invention include the observation or photography of the images obtained directly on the phosphor screen, there are some special uses for which other arrangements are desirable. My invention may be used for quantitative determination of temperatures or temperature distribution. In this case the brightness of the phosphor used as receiver of thermal radiation is measured by visual photometry or by photoelectric means, particularly when a permanent record (by any conventional recording method) is desired.

In another embodiment the phosphor screen is scanned by means of a suitable optical system in conjunction with the photoelectric cell, and the current is recorded so as to yield a quantitative record of the brightness distribution on the screen, and therewith, a record of the temperature distribution or distribution of radiation in the object. This specialized embodiment can be extended by using sufficiently high scanning speeds and short time constants in the photo currents fed into the cathode ray tube, and thus the original phosphor screen may be reproduced by a system similar to ordinary television, but of course the equipment is more elaborate than that which is used for simple recording or measuring of temperature or temperature distribution.

In other cases, it is desirable to use only a small dot or strip of phosphor material in place of the large screen, and to scan the image in the image forming device with this strip or dot, the brightness of which is measured by a suitable photoelectric measuring device. Fairly high sensitivities can be reached with such phosphor bolometers, particularly if this method is used to measure the difference in brightness between a piece of phosphor surface, receiving the radiation to be measured and a second surface not receiving such radiation but otherwise equal to the first.

Screen structure

The phosphor screens for the present invention are preferably made with as small an amount of binder as possible in order to keep the thermal capacity, and with it the time lag in the response of the phosphor screen to changes in thermal radiation, as small as possible. Furthermore, it is often desirable to use a comparatively small amount of phosphor per unit area of the screen so as to reduce further the thermal capacity. Both of these reductions of the mass of the screen are limited, of course, by the need of obtaining good absorption of the incident radiation by the screen material. The reduction in the amount of phosphor is further limited by the need of obtaining sufficient brightness with an excitation which may in turn be limited in its intensity because of the intensity dependence of the temperature coefficient. On the other hand, a thin screen is desirable from the point of view of resolving power. Screens of several tenths of a millimeter thickness generally have a resolving power which is slightly less than may be desirable, due at least in part to the conduction of heat within the screen material ("lateral conduction"). This source of unsharpness may be reduced or eliminated by using screens of a special structure in which the phosphor forms a pattern of dots which respond only to the radiation received by them, and which are thermally insulated from one another. When this pattern is fine enough the resulting screen has a higher resolving power than the normal continuous phosphor screen. For most purposes, I do not bother with this added refinement however. On the other hand, this preferred feature of the invention is applicable to systems using phosphorescent phosphors instead of fluorescent ones and utilizing the temperature gradient of one or more of the various phosphorescent phenomena, such as spontaneous afterglow, stimulation, quenching, exhaustion, etc.

The operation of the invention and the advantages of certain embodiments thereof will be fully understood from the following description when read in connection with the accompanying drawings, in which:

Fig. 1 is a perspective view of one embodiment of the invention.

Figs. 2 and 3 illustrate respectively an object having different temperatures in different areas thereof and the image of this object as seen on a screen according to the invention.

Fig. 4 is the cross section of an embodiment of the invention, slightly different from that of Fig. 1.

Figs. 5A to 5C constitute a flow chart of a masking feature used in an embodiment of the invention particularly intended for the detection of small temperature differences.

Fig. 6 illustrates an embodiment in which temperature distribution is scanned and recorded.

Figs. 7, 8, 9 and 9A are cross sections of two image forming units employing a highly sensitive form of the invention.

Figure 10:
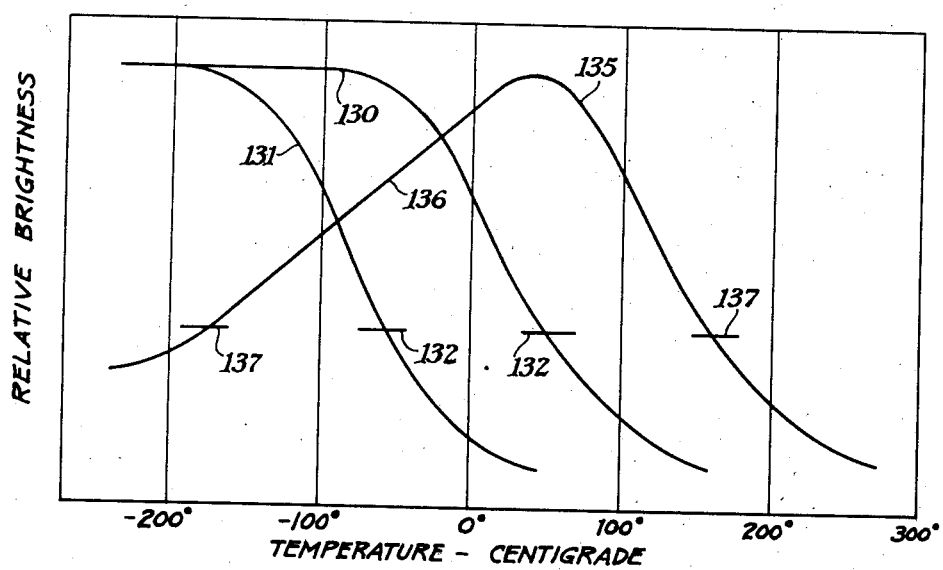
Figure 11:
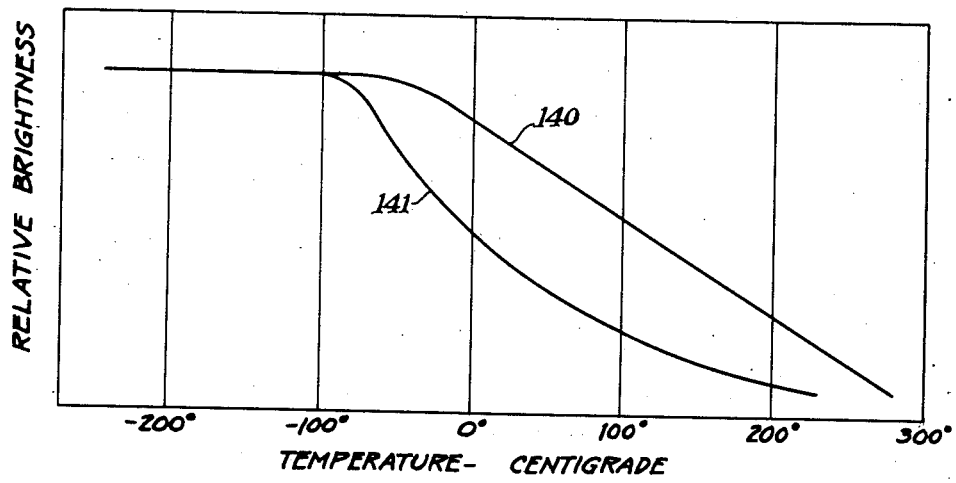

Figs. 10 and 11 are graphs of the response of typical phosphors to changes in temperature.

In Fig. 1 a kettle 10 in which water is boiling due to the heat from an electric hot plate 11 represents an object whose image, as formed by its own radiation, is to be viewed or photographed. The image is formed by a rock salt lens 12 on a phosphor layer 13. The phosphor 13 is more or less uniformly illuminated by an ultra-violet lamp 17. In the absence of any long wavelength image, the eye 18 would see the fluorescent screen 13 uniformly bright. The screen 13 is at room temperature (10° C. to 30° C.) and hence any image formed thereon of an object also at room temperature will not cause any variation in this uniform fluorescence. For example, the background behind the kettle 10 is at room temperature and hence any light reaching the area 20 of the phosphor from the background has no effect on the uniform fluorescence. The kettle 10 itself is at 100° C., and the image thereof formed by the lens 12 heats up the area 21 of the phosphor and renders the image of the kettle visible on the phosphor screen. This image may be viewed by the eye 18 of an observer or may be photographed by a camera 22. Radiation from the hot plate 11 itself is cut off by a shield 16 at room temperature.

It is more convenient to focus very long wavelength radiation by means of a mirror such as the concave mirror 25 shown in Fig. 4. In Figs. 2, 3 and 4 the object consists of a pan 26 of boiling water resting on a hot plate 27, and a cube of ic 28 adjacent to a wedge of Dry Ice 29. Light from this object as indicated by broken lines 31 is brought to focus on a phosphor screen 32 which is illuminated by an ultraviolet source consisting of lamps 33. The image on the phosphor 32, as seen by the eye 34 of an observer through an aperture 35 in the mirror 25 appears as shown in Fig. 3. Due to the ultraviolet light, the phosphor is uniformly fluorescent and is substantially at room temperature. Light from the background 37 or from the shield 38, which are both at room temperature, does not affect the fluorescence of the layer but the long wavelength radiation from the pan 26 causes the area 39 to be darker than the surrounding areas on the screen. The blocks of ice 28 and Dry Ice 29 serve to cut off the radiation from the background 37 so that the phosphor 32 is at a slightly lower temperature in the areas 40 and 41 than elsewhere. In fact there is an observable difference in brightness between the two spots 40 and 41 due to the greater radiation from the ice 28 than from the colder Dry Ice 29. The contrast between either of these spots and the background area 42 or the contrast between the background area 42 and the image 29 is quite high and distinctly visible. The contrast and particularly the sharpness of the images is affected directly by the conductivity of heat within the phosphor layer 32 itself. For example, heat in the image 39 tends to wander into the background area and to decrease the brightness thereof and similarly the heat from the background area is conducted into the image areas 40 and 41. Secondly, areas 40 and 41 receive the radiation from all objects in the room which are not shielded from these areas, for example, the mirror 25 is itself at room temperature and is radiating toward the phosphor. Thus the contrast of the dark images 40 and 41 is not nearly as great as it would be if all objects near the phosphor were at Dry Ice or liquid air temperature and the heating of the screen was nearly exclusively due to the radiation from the background 37.

One simple manner of cutting off the images 39, 40, and 41 is to insert a glass plate in front of the object 26 cutting off the rays 31. The distance of the lamps 33 from the phosphor 32 determines the intensity of exciting radiation and hence, for many phosphors, the intensity of fluorescence of the layer 32. As noted before, I have found that with certain phosphors the contrast of the images can be varied considerably by changing the distance of the lamp 33 from the phosphor 32. In the arrangement shown, the lamps 33 are adjustable along supports 45, provided with scales 46 on which pointers 47 indicates the setting of lamp distance. With phosphors which show this variation, such as the phosphors mentioned above, I prefer to make this adjustment of illumination intensity to get the maximum contrast as far as this is compatible with other requirements. Often the maximum contrast would be obtained at brightness levels too low for convenient visual observation or for short enough exposure times on photographic recording. A suitable compromise is made in such cases between the various requirements. To illustrate just how efficient the present invention is, I point out that with an arrangement such as is illustrated in Fig. 4, I have produced a clear contrasty image such as 39, of a pan of boiling water located at a distance of six feet from a phosphorescent screen using a mirror 25 operating at f/0.7 effective relative aperture. With the same system I have obtained a just visible image of human limbs by their own radiation against a background of normal room temperature. Clear photographic records of such pictures have been obtained by a suitable photographic technique such as described below.

Figs. 5A to 5C illustrate one method of using masking to compensate for unevenness of the screen material or of the illumination of the screen. These blemishes or other nonuniformities are actually very small indeed, but frequently the slight resulting differences in brightness are such that the sensitivity to thermal changes is obliterated or at least reduced by the unevenness. A phosphor 50 which is not perfectly uniform or which receives nonuniform illumination from the ultraviolet sources 51, flouresces and the light therefrom passing through an aperture 53 in a concave mirror 52, is focused by a lens 54, through the base 56 of a photographic plate, onto the photosensitive emulsion 55 carried thereon. To insure that no image is focused by the mirror 52 onto the phosphor 50, a large flat surface 57 at room temperature is placed so close to the system as to be compeltely out of focus. Any radiation from the surface 57 is diffused uniformly over the phosphor 50 or passes harmlessly to one side.

The next step in the process as shown by Fig. 5B involves ordinary photographic processing of the emulsion layer 55 to form an image 58 of the nonuniformities in the phosphor 50. The processing is such as to give a gamma of unity to the image 58 with respect to the phosphor 50.

As shown in Fig. 5C, the unit gamma image 58 is then used as a mask immediately in front of the image 61 formed by the lens 54 when the instrument is used in the way intended. That is, the device is now focused on an object 60 and the image thereof is sharply focused on the phosphor 50 by the concave mirror 52. This image, as it appears on the phosphor 50 due to variations in the fluorescence of the phosphor, is refocused according to the invention by the lens 54 at the point 61. The record 58 acts as a mask cancelling out any unevenness in the phosphor 50 other than those due to the thermal image of the object 60. A photographic film may be placed at the image 61 to make a permanent record in the usual way or this image 61 may be viewed through an eyepiece 62 by the eye 63 of an observer. Small inhomogenities visible on the phosphor surface without the transparency 58, disappear completely when the transparency 58 is inserted in proper register as shown in Fig. 5C. When the mask is used, the field appears perfectly homogeneous and very small brightness differences are easily observable.

It is sometimes desirable to make a permanent record in numerical or graphic form of the temperature distribution over the surface of a body. Fig. 6 shows the invention applied directly to such a measurement of the surface of a flat iron 65. A lens 70 focuses an image of the flat iron 65 on a phosphor 66 which is illuminated by sources 69 of exciting (fluorescigenous) radiation so that it fluoresces in accordance with its temperature at any point. Any photo-electric scanning device 67 is used to pick up the brightness at each point of the phosphor screen 66 and a recorder 68, records the brightnesses as the scanning progresses. In many cases a simple scanning device, with moving phototube or lens or mirrors or even with a scanning movement of the whole device may be used. The scanning may be in one or two dimensions. If very rapid recording is required any standard scanning device, as employed in television systems, may be used. Instead of using a cathode ray type scanner, or any of the other scanners commonly used in television, the surface being tested may be a continuously moving one and the spot on the phosphor whose brightness is measured and recorded may be fixed in space, with a photoelectric cell immediately adjacent thereto.

For the operation of the invention with the phosphor screen at low temperature, or for that matter, at any constant temperature, devices shown in Figs. 7 and 8 may be used. As pointed out previously the selection of phosphor temperature is determined by two factors, optimum sensitivity to temperature differences and minimum effect of extraneous sources of heat. Fig. 7 shows a device wherein the phosphor layer 71 is made up without any auxiliary supporting sheet so as to reduce heat capacity to a minimum. Such phosphors are relatively fragile and for this reason the frame 72 for the phosphor is supported in an enclosed housing 82 by springs 73.

When the cap indicated by broken lines 75 is removed, infrared radiation shown by rays 76 passes through a rock salt window 77 and an aspheric correcting plate 78 to be focused by a concave reflector 79 onto the phosphor 71. The phosphor is excited by ultraviolet lamps 81 enclosed with the phosphor in the housing 82. The visible image formed in the fluorescing phosphor layer 71 is viewed by the eye 83 of an observer through a simple telescopic system 84 and a mirror 85. A layer 86 of ordinary glass reduces the amount of stray radiation reaching the phosphor layer 71 but still permits the passage of the light from the visible image to the mirror 85. The whole unit is maintained at constant low temperature by a cooling system 90 and an insulating wrapping 91 surrounding the unit on all sides except the front.

The low heat conduction in the phosphor layer and its good thermal insulation sometimes results in a lingering of the heat and hence a lingering of the image in the phosphor. In order to wipe off the image rapidly to permit immediate re-use of the detector, this particular device is provided with an arrangement for cooling the phosphor itself by gas. The volume of the chamber around the phosphor 71 is kept to a minimum by rock salt plates 92. When the image on the phosphor 71 is to be wiped off, the cap 75 is placed over the front of the device and a valve 95 is opened which connects the phosphor chamber to a vacuum system 96. This exhausts the gas from the phosphor chamber and immediately replaces it through the inlet 97 with cooled dry gas which chills the phosphor 71 and removes any image therefrom. This particular operation may be performed quite rapidly and the maximum rate at which a phosphor can be wiped clear by this system and re-used is sufficiently high for ordinary purposes. This air cooling system is a feature of the invention (a second one is the brush mounting described below) which is applicable to phosphorescent as well as fluorescent systems.

A slight variation of this arrangement is shown in Fig. 8 wherein the infrared rays 100 are focused by a rock salt, silver chloride, achromat 101 through a rock salt window 102 onto a phosphor layer 103. The structure of the phosphor layer is specifically illustrated in Figs. 9 and 9A. In order to gain maximum resolution, it is necessary to reduce to a minimum the transfer of heat from one point of the phosphor to the adjacent points. Therefore phosphor tips 103 are mounted on the ends of nylon bristles 104 which form a brush of very closely spaced bristles carried on a support 105. Such an arrangement is not as fragile as a single phosphor layer, but if any of the phosphor tips 103 fall off the bristles, the net result appears as a blemish in the image formed in the phosphor layer. Therefore the brush support 105 is carried by springs 107 to reduce the effects of shock. The image formed on the front surface of the brush is then either photographed or viewed by reflection from a rock salt semi-transparent mirror 110. That is, visible light from the phosphor is collimated by the achromat 101, reflected by the mirror 110, and then focused by the objective 111 onto the surface 112. If this surface is transparent or is a ground glass the image may be viewed through an eyepiece 113 by the eye 114 of an observer. Alternatively, the surface 112 may be replaced by a photosensitive film for making a permanent record of the fluorescent image. In this arrangement the excitation energy for the phosphor is received from outside the cold chamber. This energy comes from an ultraviolet lamp 115 and illuminates the phosphor more or less uniformly.

The whole unit is carried in an insulating housing 120 and the temperature is maintained constant by a suitable cooling fluid 121. This fluid serves not only to cool the unit but also as the coolant for the gas before it enters the phosphor chamber. That is, dry gas is fed at intervals when needed through the pipe 122 which is arranged as a coil 123 in the cooling fluid. The gas enters the phosphor chamber at the point 124 and is removed from the chamber through pipe 125 whenever the valve 126 is opened connecting the phosphor chamber with a large evacuated chamber 127. This chamber permits a rapid change of air or other gas.

In Fig. 10 the relative brightness of a phosphor under constant excitation is plotted against temperature. The curves may therefore be interpreted as curves of fluorescent efficiency. Typical phosphors are represented.

Many phosphors have an efficiency which continues at an optimum value throughout the range of lower temperatures (perhaps all the way to absolute zero) but which falls off at higher temperatures depending on the particular phosphor used. The curve 130 which happens to be a zinc sulfide, cadmium sulfide, mixture activated by silver and small amounts of nickel,

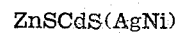

ZnSCdS(AgNi)

is representative of this group. Some phosphors of this group, but not all, have a temperature response curve which depends on the intensity of activation. The last mentioned phosphor is one of these, and the curve 130 is the curve for constant excitation produced by holding a mercury ultra violet lamp close to the phosphor; e. g., a General Electric AH4 ultra violet lamp with a Standard Corning No. 5860 filter at about six inches from the phosphor. These details are not critical since only relating brightness is involved and response varies from one phosphor to the next anyway. When the intensity of excitation is reduced to less than 1% of that represented by curve 130, the temperature distribution curve of the same phosphor is represented by the curve 131. Furthermore, intermediate values may be easily obtained anywhere in this range merely by adjusting the distance of the light source from the phosphor. Since relative contrast is the critical factor in determining sensitivity, it is preferable to use these phosphors in the temperature range where their intensity is less than one-third the optimum, as represented by the lines 132. That is, the phosphor represented by curve 130 is most useful between 60° and 200° C. whereas the phosphor and excitation level, represented by the curve 131, are most useful between —50° and +50° C. According to the invention, I maintain the phosphor in the temperature range in which it is most effective as an indicator of temperature variations.

A few phosphors have an efficiency which falls off from the optimum at both lower and higher temperatures. The curve 135, cadmium borate, activated by manganese, $Cd_2B_2O_5(Mn)$ is typical of these phosphors and the low temperature slope 136 of this curve shows a positive temperature coefficient. That is, between —200° C. and about 30° C. this phosphor increases in brightness with temperature and above 50° C. it decreases in brightness the same as most phosphors. This particular curve is practically the same whether the excitation is ultraviolet light or beta ray emission from radioactive materials or cathode ray tubes. There is a slight difference, but it is not appreciable for temperature measurements. On the other hand, there are some phosphors whose response does depend on the type of excitation and on the intensity and velocity of the beta on cathode rays.

Fig. 11 shows the efficiency curves for cadmium molybdate, lead molybdate mixtures in which there is at least 90% cadmium molybdate, $CdMoO4, PbMoO4$. Curve 140 shows the efficiency of this phosphor when excited by the 3650 Å. line of mercury whereas the curve 141 shows the response of the same phosphor when illuminated by the 2537 Å. line of mercury.

As pointed out above, it is preferable to employ the phosphors at the temperatures in which their efficiency is below one-third of the optimum value for that particular phosphor. The only lower limit on the efficiency and hence on the selection of temperatures, is that the brightness must be enough to see or to photograph conveniently. It is obvious that phosphors are useful over a wide range of temperatures and hence the threshold visibility or minimum photographic brightness rarely is considered since this extreme limit is rarely encountered in practice. It is repeated here that these limits concern the temperature of the phosphor, not the temperature of the radiating body whose image is being detected or recorded. Some of the zinc sulfide, cadmium sulfide mixtures at average levels of intensity are preferable for many purposes, since the useful range is at normal room temperatures. These specifically are the ZnS,CdS phosphors activated with Ag (or activator) with the addition of Ni or Co. Other ZnS,CdS phosphors, e. g., when activated by Cu or Mn have their greatest sensitivity to temperature in much higher temperature ranges. When maximum temperature sensitivity is sought, the curves are plotted against the logarithm of the relative brightness and the steepest portion of the curve is then the most sensitive provided the brightness is sufficiently high for Weber's law to be approximately valid. In all practical cases so far tested this falls in the range below one-third optimum efficiency as discussed above. Reference may be made to the cofiled application mentioned above for a further discussion of different types of phosphors and types of responses since in the cofiled application the phosphor operates at the temperature of the body being tested and therefore there is a restriction or limitation on the selection of the phosphor which is not present in connection with detection of radiation. Since the phosphor must be selected to be temperature sensitive in the range in which it is to be used, it is desirable to have available phosphors for various temperatures. Either different phosphors may be used, or in some cases the level of intensity of excitation may be varied and in other cases the type of excitation such as the wave length of the ultra violet radiation or the use of beta ray or cathode rays in place of ultra violet is satisfactory.

The greatest contrast is obtained in any of the embodiments of my invention with phosphors whose rate of change of fluorescence with temperature is greatest. For most practical purposes I prefer to use a phosphor whose percentage change in brightness per degree change in temperature is at least 5% per degree C.

Having thus described preferred embodiments of my invention I wish to point out that it is not limited to these particular arrangements but is of the scope of the appended claims.

I claim:

1. The method of rendering visible an image formed by long wavelength, heat producing, radiation which comprises uniformly illuminating with exciting radiation a layer of fluorescent phosphor having a temperature range of approximately optimum fluorescence efficiency, maintaining the phosphor in a temperature range which is just higher than said optimum range and in which the efficiency is less than ⅓ of the optimum and decreases, causing less bright fluorescence, with increasing temperature and, simultaneously with said illuminating and maintaining, focusing the long wavelength image onto the layer.

2. The method according to claim 1 including the additional steps of first preparing a unit contrast negative mask from the layer uniformly illuminated at the temperature at which it is to be maintained and optically masking the layer with said mask during said focusing to eliminate substantially all apparent brightness inhomogeneities in the layer other than those due to said image.

3. The method according to claim 1 in which, prior to said focusing, the phosphor layer is brought to uniform temperature in said higher temperature range by circulating over the layer a gas substantially at said uniform temperature.

4. The method of rendering visible an image formed by long wavelength, heat producing radiation, which comprises uniformly illuminating with exciting radiation a layer of a fluorescent phosphor whose efficiency decreases with increasing temperature at least 5 percent per degree centigrade within predetermined ranges of temperature and excitation, preparing a unit contrast negative mask from the layer uniformly illuminated within said predetermined ranges, optically masking the layer with said mask to eliminate substantially all apparent brightness inhomogeneities in the layer, maintaining the phosphor at a temperature within said predetermined range of temperature, maintaining the excitation constant within said predetermined range of excitation and simultaneously with the maintaining of the temperature range and excitation, focusing said long wavelength image onto the masked layer.

5. The method of rendering visible an image formed by a long wavelength, heat producing, radiation which comprises uniformly illuminating with exciting radiation a layer of a fluorescent phosphor whose efficiency decreases with increasing temperature at least 5 percent per degree centigrade within predetermined ranges of temperature and excitation, maintaining the excitation constant within said predetermined range of excitation, maintaining the phosphor within said predetermined range of temperature, circulating a uniform temperature gas over the layer to bring the phosphor layer to a uniform temperature within said predetermined range, ceasing said circulating and then, simultaneously with the maintaining of the temperature range and excitation, focusing the long wavelength image onto the layer.

6. A heat sensitive screen for rendering visible an image focused thereon by any non-visible heat producing radiation, comprising a fluorescent phosphor layer whose efficiency decreases with increasing temperature at least 5 percent per degree centigrade within predetermined ranges of temperature and excitation and whose fluorescent brightness is a non-linear function of the excitation intensity within this range, said phosphor containing an amount of fluorescence poison sufficient to reduce the fluorescent efficiency to less than one third of the efficiency of the same phosphor in the same ranges without the fluorescence poison, means having low heat capacity and conductivity supporting the layer, means for maintaining the layer within said predetermined range of temperature, means for uniformly illuminating the layer with exciting radiation within said predetermined range of excitation while focusing said image thereon and means for adjusting the intensity of said exciting radiation.

7. A device according to claim 6 in which said supporting means consists of a brush with closely spaced, low heat conductivity, bristles, a particle of the phosphor being on the end of each bristle and adjacent to particles on the other bristles.

8. A device according to claim 6 including means for temporarily circulating gas over the phosphor layer to bring it to uniform temperature, prior to focusing the image thereon.

9. A heat sensitive screen for rendering visible an image focused thereon by any non-visible heat producing radiation, comprising a layer of fluorescent phosphor maintained in a relatively high temperature range above that of optimum fluorescent efficiency in which high range the efficiency is less than one third of the optimum and decreases, causing less bright fluorescence, with increasing temperature, means having low heat capacity and conductivity supporting the layer and means for uniformly illuminating the layer with exciting radiation while maintaining said relatively high temperature range and while focusing said image thereon.

10. A screen according to claim 9 having optically in register with the layer a mask of unit contrast and negative to the fluorescence of the phosphor under conditions of uniform excitation and temperature, for eliminating substantially all apparent brightness inhomogeneities in the layer other than those due to said image.

11. A screen according to claim 9 including means for temporarily circulating a constant temperature gas over the layer for bringing it to a uniform temperature prior to said focusing.

12. A screen according to claim 9 including means for adjusting the intensity of said exciting radiation.

13. A screen according to claim 9 in which said phosphor is a non-linear one having a fluorescent brightness which is a non-linear function of the excitation intensity.

FRANZ URBACH.

References Cited in the file of this patent

UNITED STATES PATENTS

| Number | Name | Date |
|---|---|---|
| 1,953,471 | Eich | Apr. 3, 1934 |
| 2,074,226 | Kunz et al. | Mar. 16, 1937 |
| 2,085,508 | Neubert | June 29, 1937 |
| 2,099,023 | Levy et al. | Nov. 16, 1937 |
| 2,188,661 | Knoll | Jan. 30, 1940 |
| 2,225,044 | George | Dec. 17, 1940 |
| 2,402,762 | Leverenz | June 25, 1946 |
| 2,457,981 | De Forest | Jan. 4, 1949 |

OTHER REFERENCES

Solid Fluorescent Materials, by R. P. Johnson, American Journal of Physics, June 1940, pp. 143–153.